United States Patent
Yoshida et al.

[19]

[11] Patent Number: 6,164,694
[45] Date of Patent: Dec. 26, 2000

[54] AIRBAG DEVICE

[75] Inventors: Ryoichi Yoshida; Hiroshi Aoki, both of Tokyo, Japan

[73] Assignee: Takata Corporation, Tokyo, Japan

[21] Appl. No.: 09/309,908

[22] Filed: May 11, 1999

[30]  Foreign Application Priority Data

May 20, 1998 [JP] Japan .................................. 10-138528
Apr. 5, 1999 [JP] Japan .................................. 11-097857

[51] Int. Cl.$^7$ .................................................. B60R 21/26
[52] U.S. Cl. .......................................... 280/736; 280/735
[58] Field of Search .................................. 280/735, 736, 280/731, 734, 741, 742, 743.1

[56]  References Cited

U.S. PATENT DOCUMENTS

| 4,950,458 | 8/1990 | Cunningham . |
| 5,957,490 | 9/1999 | Sinnhuber ................................ 280/735 |
| 5,964,478 | 10/1999 | Stanley et al. .......................... 280/735 |

FOREIGN PATENT DOCUMENTS

| 0 836 971 | 4/1998 | European Pat. Off. . |
| 40 41 049 | 7/1992 | Germany . |
| 19526334 | 1/1997 | Germany . |
| 0 319 997 | 6/1998 | United Kingdom . |

OTHER PUBLICATIONS

"Frontal Shock 7. The Evolution of Material Used for Shock Detection,"W. Suchowerskyj, de l'Ingénieurs Automobile [Automotive Engineers]SIA, Paris, periodical 1141, No. 6, 1982, pp. 69–77.

*Primary Examiner*—Lanna Mai
*Assistant Examiner*—Kevin McKinley
*Attorney, Agent, or Firm*—Kanesaka & Takeuchi

[57]  ABSTRACT

An airbag device has an inflator to charge a small amount of gas into an airbag so as to inflate the airbag at a low internal pressure when an occupant is in proximity to the airbag device, and charges a large amount of gas into the airbag so as to inflate the airbag largely when the occupant is apart from the airbag device sufficiently. When an ignition signal is generated, a first igniter is fed currency first of all to generate a gas from a gas generating agent within a first compartment 6 and an airbag 1 begins to expand. When an occupant P is in proximity to the airbag device, the airbag 1 contacts with the occupant P immediately after starting to expand and a distance between a static pad 12 and an opposite pad 20 increases slowly. A static capacity detected in a static capacity detecting circuit 30 decreases slowly. When the static capacity exceeds a threshold value at a point when 10 millisecond have passed after an input of the ignition signal, a second igniter 9 is triggered.

11 Claims, 3 Drawing Sheets

AIRBAG DEVICE

BACKGROUND OF THE INVENTION AND RELATED ART STATEMENT

The present invention relates to an airbag device which inflates an airbag to protect an occupant in a vehicle when the vehicle comes into collision.

An airbag device, which inflates an airbag thereof to protect an occupant in a vehicle in case of emergency such as the vehicle comes into collision, has a folded airbag, a member enclosing the airbag, and a gas generating device called as an inflator.

The inflator has a casing provided with openings as gas outlets, a gas generating agent filled in the casing, and an igniter to start reaction of the gas generating agent in such a manner that the igniter is actuated in case that a vehicle comes into collision.

An inflator disclosed in the U.S. Pat. No. 4,950,458 has a time-gas pressure characteristics where a gas generating pressure is relatively low at a beginning of operation thereof and is raised after a certain period of time has elapsed. The inflator of the U.S. Pat. No. 4,950,458 has an aluminum housing divided into two compartments. The inflator triggers a gas generating agent within one compartment at first, and then triggers a gas generating agent within the other compartment in a short lag so as to delay a rise of the gas pressure.

The inflator of the U.S. Pat. No. 4,950,458 is sure to trigger both the gas generating agent filled within both compartments, and all gases generated are fed into the airbag.

OBJECT AND SUMMARY OF THE INVENTION

It is an object of the present invention to provide an airbag device which detects an amount of expansion of an airbag thereof during an operation of a gas generator thereof so as to control an amount of a gas charged into the airbag from the gas generator based on an output from the detector.

An airbag device of the present invention has an airbag, a gas generator to inflate the airbag, a detector to detect an amount of expansion of airbag due to an operation of the gas generator, a controller to control an amount of a gas charged into the airbag from the gas generator based on an output of the detector.

The detector may detect a distance between the gas generator and an inner surface of the airbag opposite the gas generator to detect the amount of expansion of the airbag.

The detector may consist of electrodes provided to the gas generator and the airbag respectively, and a detector for detecting static capacity between the electrodes.

An amount of the gas charged into the airbag may be increased in case the amount of the expansion of the airbag exceeds a predetermined amount at a moment when a predetermined time has elapsed from the start of the gas generator to operate.

The gas generator may has a first gas generating portion and a second gas generating portion so that the first gas generating portion is actuated at the start, and then the second gas generating portion is actuated when the amount of expansion exceeds the predetermined amount at the moment mentioned above.

The gas generator or an inflator charges a small amount of gas into the airbag so as to inflate the airbag at a low internal pressure when an occupant is in proximity to the airbag device, and charges a large amount of gas into the airbag so as to inflate the airbag rapidly with a high internal pressure when the occupant is apart from the airbag device in a long distance.

When an ignition signal is generated in an aspect of the present invention, a first igniter is fed currency first of all to generate a gas from a gas generating agent within a first compartment and an airbag begins to expand. When an occupant is in proximity to the airbag device, the airbag contacts with the occupant immediately after starting to expand and a distance between a static pad and an opposite pad increases slowly, so that a static capacity detected in a static capacity detecting circuit decreases slowly. When the static capacity does not exceed a threshold value at a point when a predetermined period of time has passed after an input of the ignition signal, a second igniter is not triggered.

When the occupant is far away from the airbag device in a long distance and the first igniter is fed currency, the airbag continues to inflate rapidly after starting to inflate and the distance between the static pad and the opposite pad increases rapidly, so that the static capacity detected in the static capacity detecting circuit decreases rapidly. When the static capacity exceeds the threshold value at the point when the predetermined period of time has passed after the input of the ignition signal, the second igniter is also triggered, and a gas generated from gas generating agents in a second compartment is fed additionally into the airbag.

DETAILED DESCRIPTION OF PREFERRED EMBODIMENTS

Figure 1:
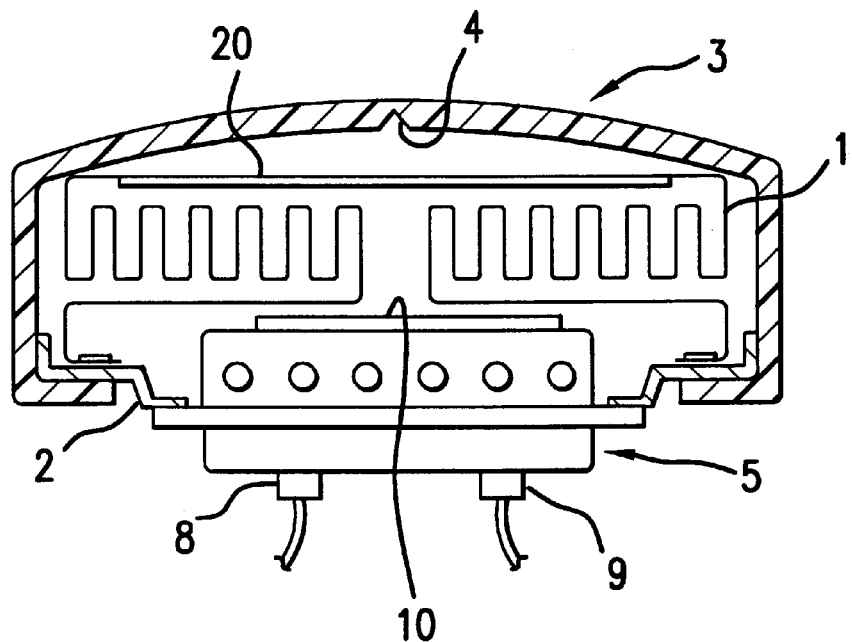
FIG. 1 is a sectional view of an airbag device according to an embodiment.
Figure 2:
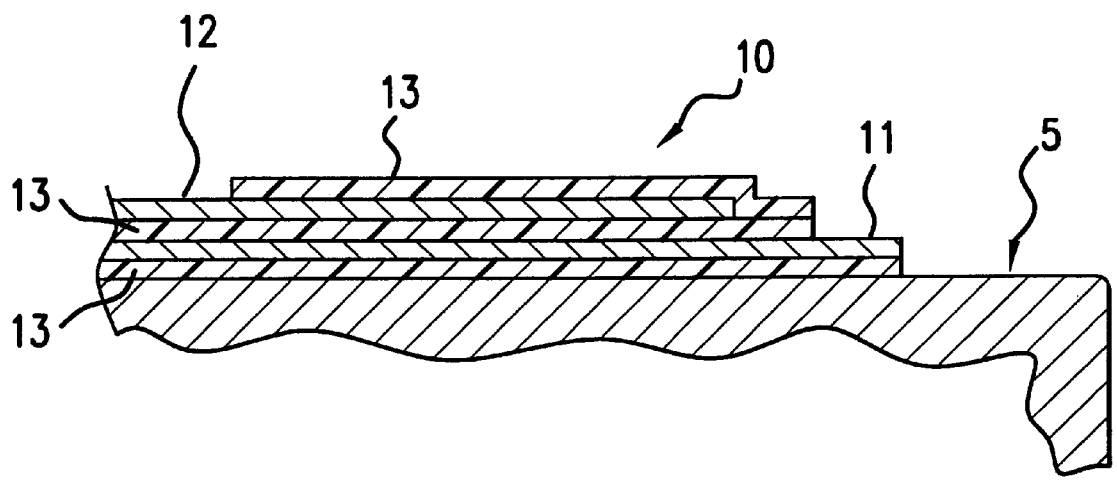
FIG. 2 is a sectional view of a fixing pad.

Hereinafter, embodiments of the present invention will be described with reference to attached drawings.

An airbag device of this embodiment relates to a driver-side airbag device which has a driver-side airbag 1 attached to a retainer 2, a module cover 3 covering the airbag 1 and attached to the retainer 2, a tear line or a groove 4 provided on the module cover 3 to lead a cleavage of the module cover 3, and an inflator 5 attached to the retainer 2. The inflator 5 has a casing made of an aluminum alloy, an inside of which is divided into two compartments of a first compartment 6 and a second compartment 7, and gas generating agents 6a, 7a are filled within the compartments 6, 7 respectively. The inflator 5 further has a first igniter 8 and a second igniter 9 for igniting the gas generating agents 6a, 7a.

The inflator 5 has an upper portion inserted into the airbag 1 through the retainer 2 and has a fixed pad 10 adhered to the top thereof by an adhesive. The fixed pad 10 consists of a support pad 11 and a static pad 12 which are made of a conductive metal film including an aluminum film, and a conductive film 13 disposed between the pads 11 and 12.

A pad 20 is arranged to be opposed against the fixed pad 10 and attached to an inner surface of the airbag 1 by adhesives or sewing. The opposite pad 20 is obtained by forming a metal layer including an aluminum layer on a surface of a resin film. The opposite pad 20 can be also obtained by coating or applying with a conductive powder or a conductive liquid paint on the inner surface of the airbag 1.

Figure 3:
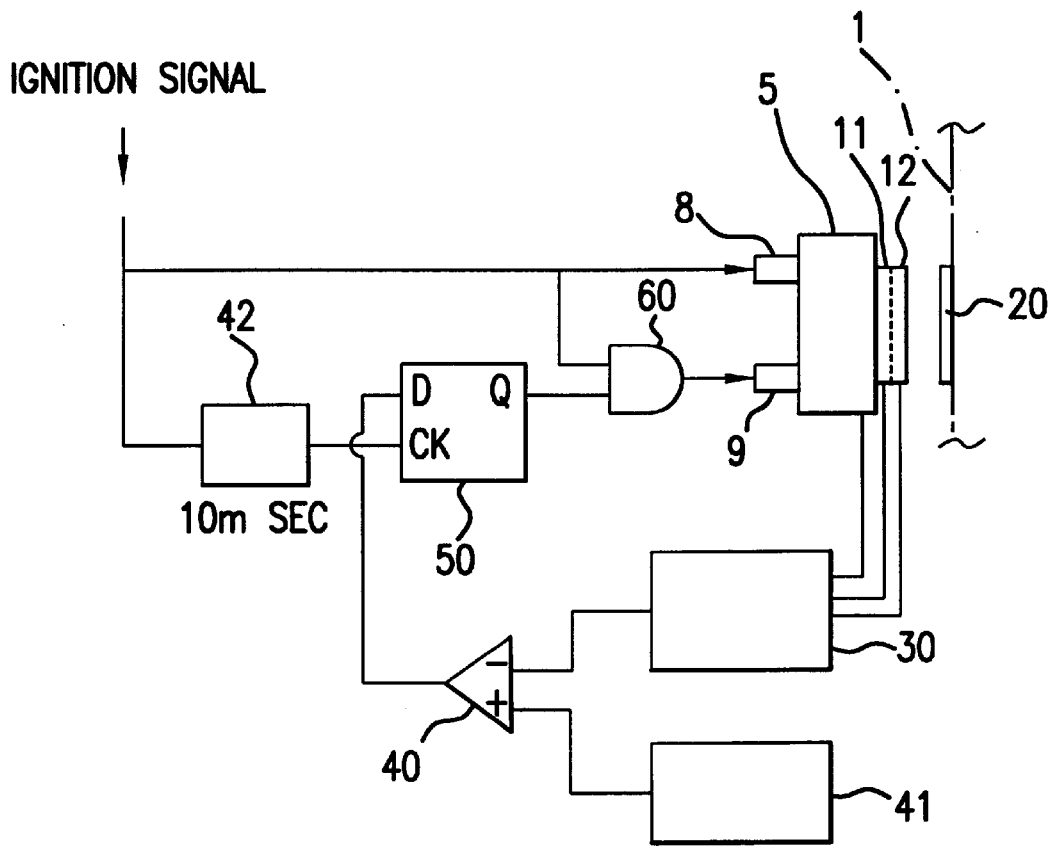
FIG. 3 is a block diagram illustrating a structure of a controller for controlling an airbag device of an embodiment.

As shown in FIG. 3, the support pad 11, the static pad 12 and the casing of the inflator 5 are conducted to an input terminal of a static capacity detecting circuit 30 respectively through leads.

The static capacity detecting circuit 30 determines static capacity between the static pad 12 and the opposite pad 20. The static capacity is inversely proportional to the distance between the opposite pad 20 and the fixed pad 10.

The static capacity between the static pad 12 and the casing of the inflator 5 consists of capacity created within the bag via the opposite pad 20 and capacity created directly between the static pad 12 and the of the inflator 5. Normally, the latter capacity is about 100 to 1000 times as large as the former. In order to detect precisely the capacity between the opposite pad 20 and the static pad 12, the capacity between the static pad 12 and the casing of the inflator 5 is substituted for the capacity between the support pad 11 and the casing of the inflator 5 by applying a signal to the support pad 11 and the static pad 12 respectively with a same phase and voltage, then the capacity between the static pad 12 and the casing of the inflator 5 can be seemingly taken as 0. As a result thereof, only the capacity between the static pad 12 and the opposite pad 20 can be detected.

The capacity between the static pad 12 and the opposite pad 20 can be detected actually by a process in which the fixed pad 10 is divided into plural pieces including two pieces, then the capacity between the divided pieces of the fixed pad 10 via the opposite pad 20 is detected.

The static capacity detecting circuit 30 converts the detected capacity to a voltage signal and inputs the signal into an inversion input terminal of a comparator 40. A predetermined constant voltage is inputted into an anti-inversion input terminal of the comparator 40 from a threshold voltage generating circuit 41. The output from the comparator 40 is inputted into an input terminal D of a D flip-flop circuit 50. An inflator ignition signal is delayed for a certain period such as 10 milliseconds by a timer 42 and inputted into a clock terminal CK of the D flip-flop 50. Both the output Q of the D flip-flop 50 and the inflator ignition signal are inputted into an AND circuit 60 and the output of the AND circuit 60 actuates the second igniter 9. The first igniter 8 is directly actuated by the ignition signal.

When the inflator ignition signal is generated due to a collision or overturning of a vehicle, the first igniter 8 is fed currency at first to generate gas from the gas generating agent within the first compartment 6 and the airbag 1 starts to inflate. When the airbag 1 is inflating, the distance between the static pad 12 and the opposite pad 20 increases and the static capacity between them decreases.

Figures 4A, 4B:
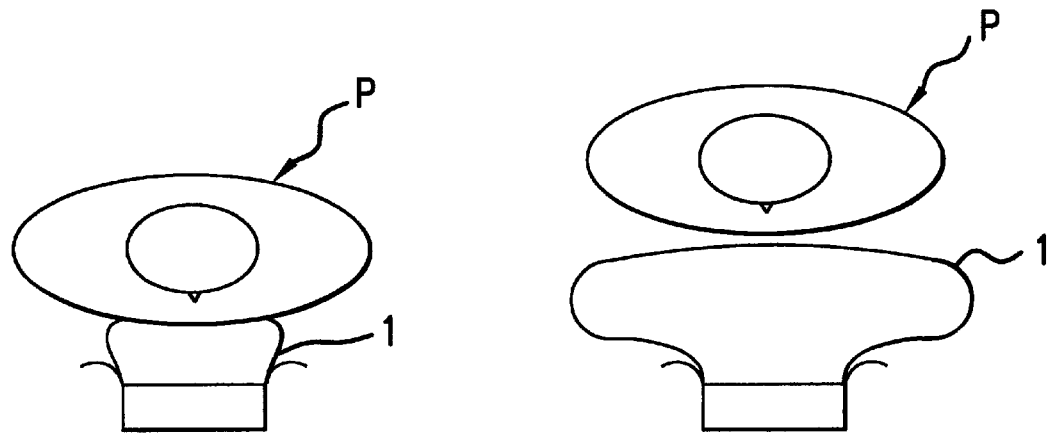
FIGS. 4a and 4b illustrate examples of operation of an airbag device.
Figure 5:
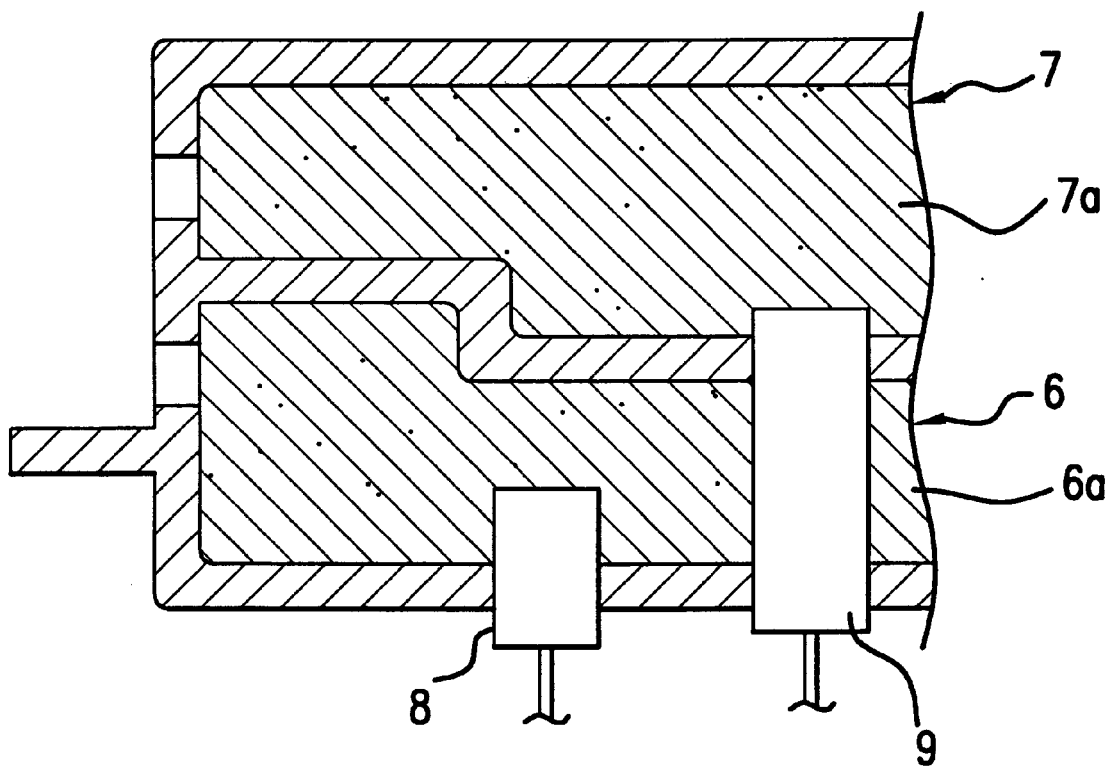
FIG. 5 is a sectional view of an inflator.

When an occupant P exists in proximity to the airbag device as shown in FIG. 4a, the airbag 1 contacts to the occupant P shortly after starting to inflate, so that the distance between the static pad 12 and the opposite pad 20 increases more slowly and the static capacity detected in the static capacity detecting circuit 30 decreases more slowly than when the occupant P is far away from the airbag device. As the static capacity between the static pad 12 and the opposite pad 20 exceeds the threshold value and the output of the comparator 40 indicates L even at the point that 10 milliseconds have passed after the input of the inflator ignition signal, the output Q remains L and the output of the AND circuit 60 also remains L so as not to trigger the second igniter 9 although the ignition signal (H) is inputted into the clock terminal CK of the D flip-flop circuit 50. Therefore, only the gas from the gas generating agent within the first compartment 6 is charged into the airbag 1 so that the airbag 1 applies low pressure to the occupant.

Hereinafter, an operation will be described in case the ignition signal is generated when the occupant is far away from the airbag device.

In this case also the first igniter 8 is fed currency immediately, and the gas is charged into the airbag 1 from the first compartment 6 to start inflating the airbag 1. As a large space exists between the airbag device and the occupant P as shown in FIG. 4b, the airbag 1 inflates rapidly without contact with the occupant P, whereby the distance between the static pad 12 and the opposite pad 20 increases rapidly and the static capacity detected in the static capacity detecting circuit 30 decreases rapidly. At the point when 10 milliseconds have passed after generation of the ignition signal, the output voltage of the static capacity detecting circuit 30 becomes lower than the threshold voltage and the output of the comparator 40 indicates H. Accordingly, when a signal H is inputted into the clock terminal CK from the timer 42, the output Q of the D flip-flop circuit 50 indicates H and the output of the AND circuit 60 also indicates H, so that the second igniter 9 is fed currency to generate the gas from the gas generating agent 7a within the second compartment 7 of the inflator 5 and the airbag 1 expands further. The largely expanded airbag 1 absorbs the impact on the occupant by plunging to the airbag.

Although the embodiment mentioned above employs a 10 milliseconds delay timer, it should be understood that the present invention is not limited thereto and the other modification can be applied.

In the present invention, the timer is preferable to be established with a delay time in a range of 5 to 15 milliseconds for a driver-side airbag device and in a range of 5 to 20 milliseconds for a passenger-side airbag device.

The airbag device of the present invention is also applicable to a passenger-side airbag device, back-seat airbag device, and side-wall airbag device.

Although the airbag device of the embodiment mentioned above has two compartments 6, 7 and two igniters 8, 9 respectively within the inflator 5 in such a manner not to trigger the second igniter when the distance between the static pad 12 and the opposite pad 20 does not exceed a predetermined length at the moment when 10 milliseconds have passed after the generation of the ignition signal, the airbag device of the present invention may be provided with more than three compartments and more than three igniters.

Although the airbag device in the embodiment mentioned above does not trigger the second igniter 9 when the distance between the static pad 12 and the opposite pad 20 is short at the moment when 10 milliseconds have passed after the generation of the ignition signal, the airbag device of the present invention can delay the ignition timing of the second igniter 9 for a longer time.

As described above, according to the airbag device of the present invention, when the occupant is in proximity to the airbag device, a small amount of the gas is charged into the airbag so that the airbag is deployed at a low internal pressure. When the occupant is apart from the airbag device in a large distance, a large amount of the gas is charged into the airbag so that the airbag is inflated rapidly.

What is claimed is:

1. An airbag device comprising:

an airbag, a gas generating device for inflating the airbag, a detecting device to detect an amount of expansion of the airbag inflated by said gas generating device, said detecting device including a first electrode provided to the gas generating device, a second electrode provided to the airbag, and a static capacity detecting device to detect a static capacity between the first electrode and the second electrode, and a controller to control an amount of gas charged into the airbag from the gas generating device based on a result of the detecting device.

2. An airbag device as claimed in claim 1, wherein said detecting means detects a distance between said gas generating device and an internal surface of the airbag opposing to the gas generating device.

3. An airbag device as claimed in claim 1, wherein plural first electrodes are provided and the amount of gas generated within the gas generating device is controlled based on the static capacity between two of the first electrodes via the second electrode.

4. An airbag device as claimed in claim 1, wherein said controller increases the amount of gas charged into the airbag when an amount of expansion of the airbag exceeds a predetermined amount at a point when a predetermined period of time has passed after actuation of the gas generating device.

5. An airbag device as claimed in claim 1, wherein said airbag device is a driver-side airbag device comprising a retainer attached to said airbag and said gas generating device, and a module cover for covering the airbag.

6. An airbag device as claimed in claim 1, wherein said airbag device is a passenger-side airbag device and said predetermined period of time is selected from a range of 5 to 20 milliseconds.

7. An airbag device as claimed in claim 1, wherein said airbag device is an airbag device for a back-seat.

8. An airbag device as claimed in claim 1, wherein said airbag device is an airbag device provided to a side wall of a vehicle.

9. An airbag device as claimed in claim 4, wherein the gas generating device has a first and a second gas generating portion and said controller actuates the first gas generating portion at first, and thereafter actuates the second gas generating portion only when an amount of expansion of the airbag exceeds a predetermined amount of expansion at said point.

10. An airbag device as claimed in claim 4, wherein said airbag device is a driver-side airbag device and said predetermined period of time is selected from a range of 5 to 15 milliseconds.

11. An airbag device as claimed in claim 9, wherein the controller actuates the second gas generating portion when the amount of expansion of the airbag is smaller than said predetermined amount.

* * * * *